(12) United States Patent
Foster

(10) Patent No.: US 7,343,923 B2
(45) Date of Patent: Mar. 18, 2008

(54) UTILITY HOT AND COLD WATER MIXING SYSTEM

(76) Inventor: Jody R. Foster, 2163 Cumbre Pl., El Cajon, CA (US) 92020

(*) Notice: Subject to any disclaimer, the term of this patent is extended or adjusted under 35 U.S.C. 154(b) by 147 days.

(21) Appl. No.: 11/191,331

(22) Filed: Jul. 28, 2005

(65) Prior Publication Data

US 2007/0023090 A1     Feb. 1, 2007

(51) Int. Cl.
*F16K 11/20* (2006.01)
(52) U.S. Cl. .................. 137/1; 68/207; 137/360; 137/597; 138/118
(58) Field of Classification Search .............. 137/15, 137/360 X, 597 X; 251/315.01 X; 68/207; 138/118
See application file for complete search history.

(56) References Cited

U.S. PATENT DOCUMENTS

| | | | | |
|---|---|---|---|---|
| 1,123,189 A | * | 12/1914 | Hannaford | 137/883 |
| 2,830,618 A | * | 4/1958 | Mitchell | 137/599.03 |
| 3,392,747 A | * | 7/1968 | Waldrop | 137/374 |
| 4,217,931 A | * | 8/1980 | Jaekel | 137/606 |
| 4,499,918 A | * | 2/1985 | Jong | 137/606 |
| 4,850,600 A | * | 7/1989 | Kaetscher et al. | 277/616 |
| 5,740,836 A | * | 4/1998 | Tang | 137/625.41 |
| 5,950,663 A | * | 9/1999 | Bloomfield | 137/359 |
| 5,996,603 A | * | 12/1999 | Dupler | 137/1 |
| 6,644,333 B2 | * | 11/2003 | Gloodt | 137/9 |
| 2003/0192611 A1 | * | 10/2003 | Weck et al. | 138/118 |

* cited by examiner

*Primary Examiner*—Stephen M. Hepperle
(74) *Attorney, Agent, or Firm*—Richard D. Clarke

(57) ABSTRACT

The present invention is directed to a utility hot and cold water mixing system consisting of three components, a hot water Y-coupler with a flow control ball valve on one side, a central Y-coupler with a flow control ball valve and a cold water Y-coupler on the other side. A unique configuration derived by twisting the connecting hoses maintains the central Y-coupler in an upright position. The system has been designed to mount to the hot and cold water faucets used by the washing machine no matter what the spacing is. It allows the temperature of the water to be preset so that each time the control valve is opened the proper temperature water is provided and no adjustments are required while providing full pressure hot and cold water to a washing machine.

20 Claims, 3 Drawing Sheets

UTILITY HOT AND COLD WATER MIXING SYSTEM

FIELD OF THE INVENTION

This invention relates to the field of devices used to connect to garage or laundry room hot and cold water faucets to facilitate the use of full pressure temperature controlled water for utility purposes such as washing pets and for removing ice, snow, oil and salt from vehicles, sidewalks and driveways. More specifically this patent deals with a unique system that allows the water temperature to be preset so that each time the control valve is opened the proper water temperature is provided and no adjustments are required while additionally providing full pressure hot and cold water to a washing machine.

BACKGROUND OF THE INVENTION

Washing of pets should be done with tepid water not cold, because pets should not be subjected to the cold water shock when they are bathed, warm water cuts their body oils more effectively and the pets will stay calmer during the washing process with warm water and will be inclined to welcome another bath. Often garden hoses are connected to cold water landscape spigots for washing pets.

Presently, there is no simple and economical means to get a controlled tepid water source in the area of the garage, which does not require adjustment, for washing vehicles. In cold climates where ice, snow and road salt are problems; a covenant tepid water source would be a great asset to homeowners.

Most garages and laundry rooms furnish hot and cold water supply for washing machines, some with separate faucets for direct connection to washing machines, and others with a mixer faucet over a laundry tub with "T" connections to the washer. Additionally some mixer faucets have a threaded end that will connect to a garden hose, but when these are used, the water temperature must be adjusted each time it is turned on. On some newer homes, a valve box is incorporated into the laundry facility. This system consisting of three components, a hot water Y-coupler with a flow control ball valve on one side, a central Y-coupler with a flow control ball valve and a cold water Y-coupler on the other side, along with adapters for newer homes with valve boxes, accomplishes the task simply and effectively while supplying full pressure hot and cold water to the washing machine.

A wide variety of mixing faucets and valves are on the market for the purpose of controlled mixing hot and cold water. Most common are the mixing faucets used on sinks within the house. These mixing faucets require adjustment every time the water is turned on to get an even flow of tepid water. Many sophisticated water flow mixing valves are available on the market, some with electronic controls to supply an even flow of tepid water every time the water is turned on. These expensive mixing valves are generally used for commercial purposes and are not readily available at pet supply stores, hardware stores or automotive supply stores. Additionally there are many devices for washing pets available, some large for a commercial use and others for home use, but they use conventional mixing faucets where the water temperature on them must be adjusted each time the devices are used to wash pets.

In this respect, before explaining at least one embodiment of the invention in detail it is to be understood that the invention is not limited in its application to the details of construction and to the arrangement of the components set forth in the following description or illustrated in the drawings. The invention is capable of other embodiments and of being practiced and carried out in various ways. It is also to be understood that the phraseology and terminology employed herein are for the purpose of description and should not be regarded as limiting.

SUMMARY OF THE INVENTION

The preferred embodiment of this invention will have a unique system of components consisting of a hot water Y-coupler, a central Y-coupler and a cold water Y-coupler connected by two hoses. The hot water Y-coupler will incorporate a flow control ball valve to adjust the desired temperature of the water put out by the pet wash system. On one side of the hot water Y-coupler is a male threaded end to connect to the hot water hose of a washing machine providing full hot water pressure. On the other side of the hot water Y-coupler is a crimped hose fitting connected to the hot water connecting hose attached to the central Y-coupler. The hot water Y-coupler is connected to the hot water faucet with a hose bib connecting nut. The central Y-coupler will attach to the hot water connecting hose and the cold water connecting hose with similar crimped hose fittings. A flow control ball valve on the hot water Y-coupler will adjust the volume of hot water through the system while the flow control ball valve on the central Y-coupler will adjust the volume of tepid water put out by the system. The cold water Y-coupler will be connected to the cold water faucet by the means of a hose bib coupling nut and will supply full pressure cold water to both the washing machine cold water hose and the central Y-coupler. The flow control ball valve on the central Y-coupler may be turned on and off as many times as desired and the same temperature of water will be available through the system. A unique feature of the system is the twist of the flexible hot and cold water connecting hoses. There is enough tensile memory in the hoses that by twisting them in the configuration that they are shown in the illustrations they will spring back to the upright position. Without this concept, the central Y-coupler would fall down behind the washing machine being difficult to retrieve. It must be understood that when the system is first turned on some cold water in the hot water lines must be flushed out before the desired temperature is delivered. The spacing of the hot and cold water faucets is not critical due to the flexibility of the hot and cold water connecting hoses on the device. Adapters are required to connect the pet wash hot and cold water mixing system to the hot and cold water valves in the valve boxes used on newer homes. This system may also be installed to the hot and cold water sources on conventional mixer faucet over a wash tub to alleviate the unnecessary adjustments required every time the water is turned on and off to achieve a desired temperature of water for washing pets.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

THE OBJECTS OF THE INVENTION

The principal object of the invention is to furnish joined connections to separate hot and cold water sources to supply a tepid water source with good pressure for utility purposes.

Another object of the invention is to furnish joined connections to separate hot and cold water sources with flexible hoses connecting to an on-off ball valve.

Another object of the invention is to furnish joined connections to separate hot and cold water sources with flexible hoses that flex out for easy connection to a garden hose.

Another object of the invention is to furnish joined connections to separate hot and cold water sources with flexible hoses configured to bend out for easy connection to a garden hose and spring back into a retracted upright position when not in use.

Another object of the invention is to produce a tepid water source that does not require adjustment every time the water is turned on.

Another object of the invention is to furnish joined connections to separate hot and cold water sources where those sources do not have the conventional spacing.

Another object of the invention is to furnish a tepid water source for washing pets that does not require adjustment every time the water is turned on.

Another object of the invention is to produce a tepid water source for a variety of other utility uses like washing vehicles and outside showers.

Another object of the invention is to produce a tepid source for the removal of ice and snow from vehicles, driveways sidewalks.

Another object of the invention is to produce a tepid water source to remove oil and salt deposits from vehicles.

And still another object is to create a utility hot and cold water mixing system that can be economically manufactured and sold at pet supply and auto parts stores.

A further object of the invention is to create utility hot and cold water mixing system that does not shock pets with cold water when they are bathed.

A final object of this invention is to add a new and unique utility hot and cold water mixing system to the area of pet supplies and auto parts.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention. There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

BRIEF DESCRIPTION OF THE DRAWINGS

The accompanying drawings, which are incorporated in and form a part of this specification, illustrate embodiments of the invention and together with the description, serve to explain the principles of this invention.

DETAILED DESCRIPTION OF THE PREFERRED EMBODIMENTS

Figure 1:
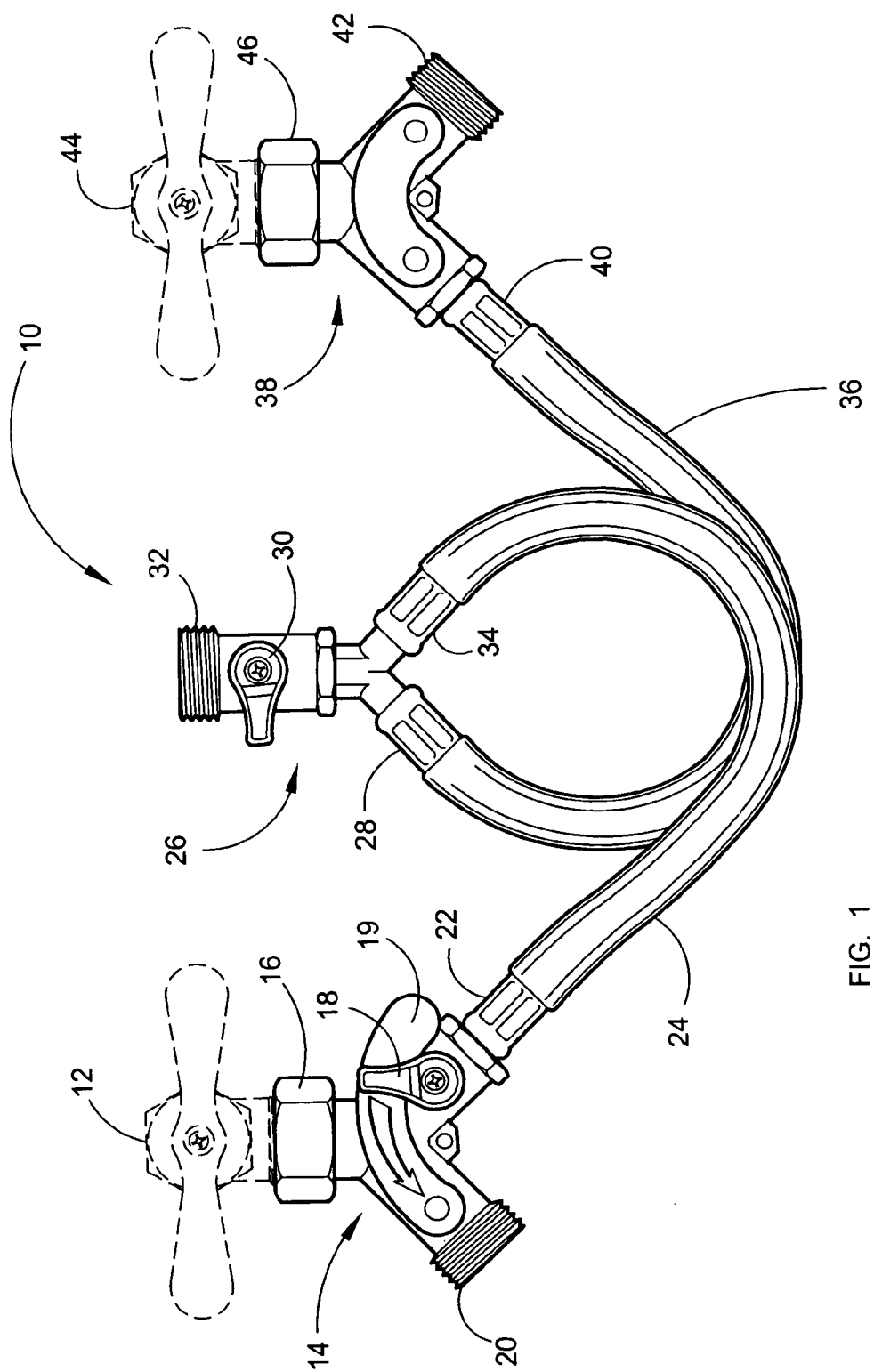
FIG. 1 depicts a front view of the utility hot and cold water mixing system.

Referring now to the drawings, wherein similar parts of the utility hot and cold water mixing system 10 are identified by like reference numerals, there is seen in FIG. 1 the hot water valve 12 shown in phantom with the hot water Y-coupler 14 attached by the means of the hose bib coupling nut 16. The hot water Y-coupler 14 is equipped with a flow control ball valve 18 to preset and maintain the temperature of the water through the system. An information plate 19 is mounted on the hot water Y-coupler 14 to indicate the direction to turn the valve to achieve the desired water temperature. The left side of the hot water Y-coupler 14 has a threaded male end 20 and the right side of the hot water Y-coupler 14 is equipped with a flow control ball valve 18 and is attached to the crimped hose fitting 22 and the hot water connecting hose 24. The hot water connecting hose is attached to the central Y-coupler 26 by the means of a second crimped hose fitting 28. The central Y-coupler 26 equipped with a flow control ball valve 30 that works as an on and off valve for the system allowing properly mixed tepid water to flow every time the valve is turned on.

The central Y-coupler 26 has a threaded male end 32 along with the two crimped hose fittings 28 and 34. The third crimped hose fitting 34 is connected to the cold water connecting hose 36 that is attached to the cold water Y-coupler 38 by the means of the fourth crimped hose fitting 40. Both sides of the cold water Y-coupler 38 supply full cold water pressure to the washing machine and to the central Y-coupler 26. The cold water will mix with the controlled amount of hot water flowing through the hot water line giving the same temperature water every time the flow control ball valve 30 on the central Y-coupler 26 is turned on. On the left side of the cold water Y-coupler 38 is a threaded male end 42. The cold water Y-coupler 38 is connected to the cold water valve 44, shown in phantom, by the means of hose bib coupling nut 46. There is enough tensile memory in the hot and cold water connecting hoses 24 and 36 that by twisting them the way that they are shown in the illustrations they will spring back to the upright position when released. Without this concept, the central Y-coupler 26 would fall down behind the washing machine being difficult to retrieve.

Figure 2:
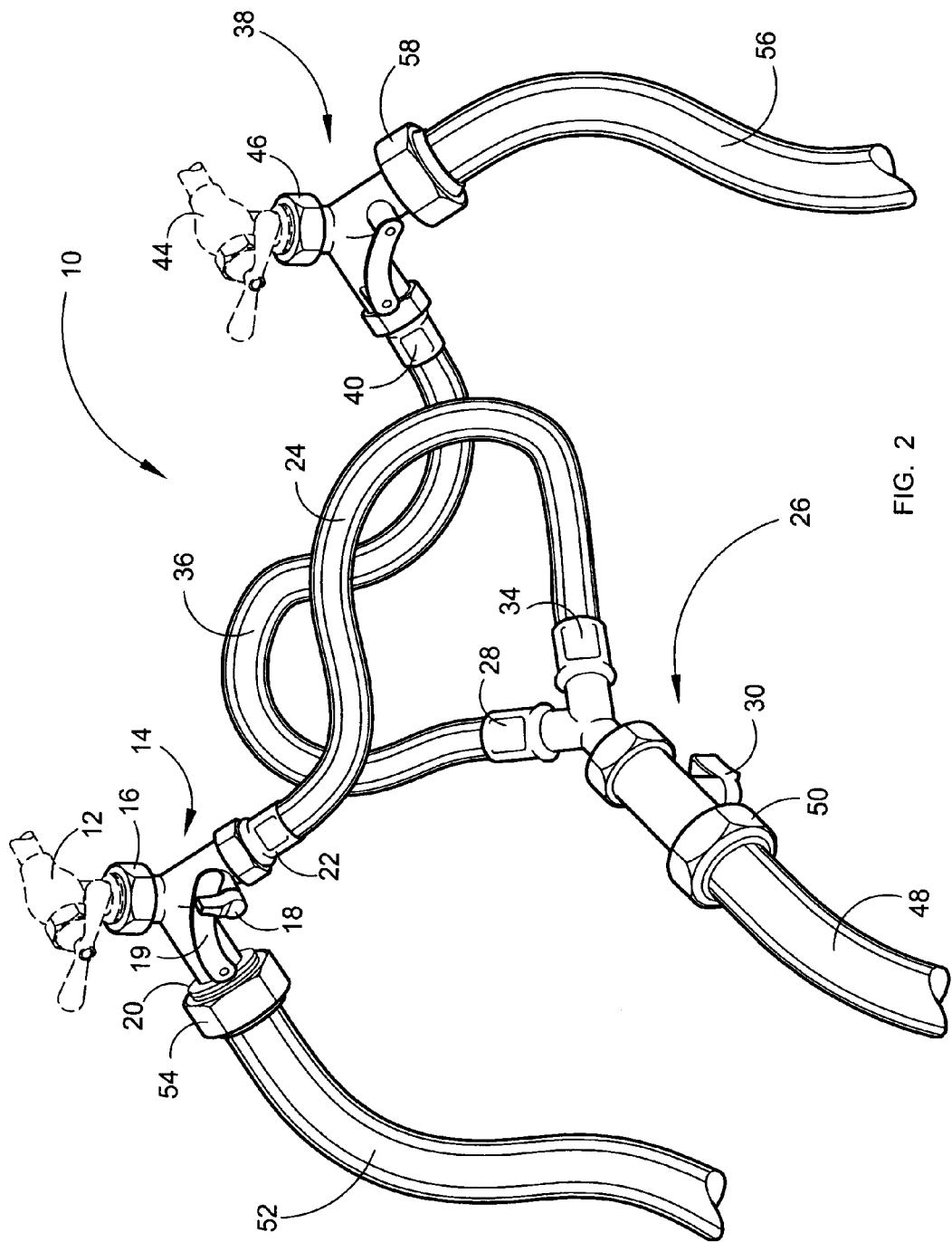
FIG. 2 depicts a perspective view of the utility hot and cold water mixing system with the hot and cold water hoses from a washing machine along with a garden hose connected to the device.

FIG. 2 depicts a perspective view of the utility hot and cold water mixing system 10 illustrating the deformed position of the device when connected to a garden hose 48 with the garden hose coupler nut 50 attaching to the threaded male end 32 of the central Y-coupler 26. The washing machine hot water hose 52 is shown connected to the hot water Y-coupler 14 with the hot water hose coupling nut 54 attaching to the threaded male end 20. The washing machine cold water hose 56 is shown connected to the threaded male end 42 of the cold water Y-coupler by the means of the cold water hose coupling nut 58.

Figure 3:
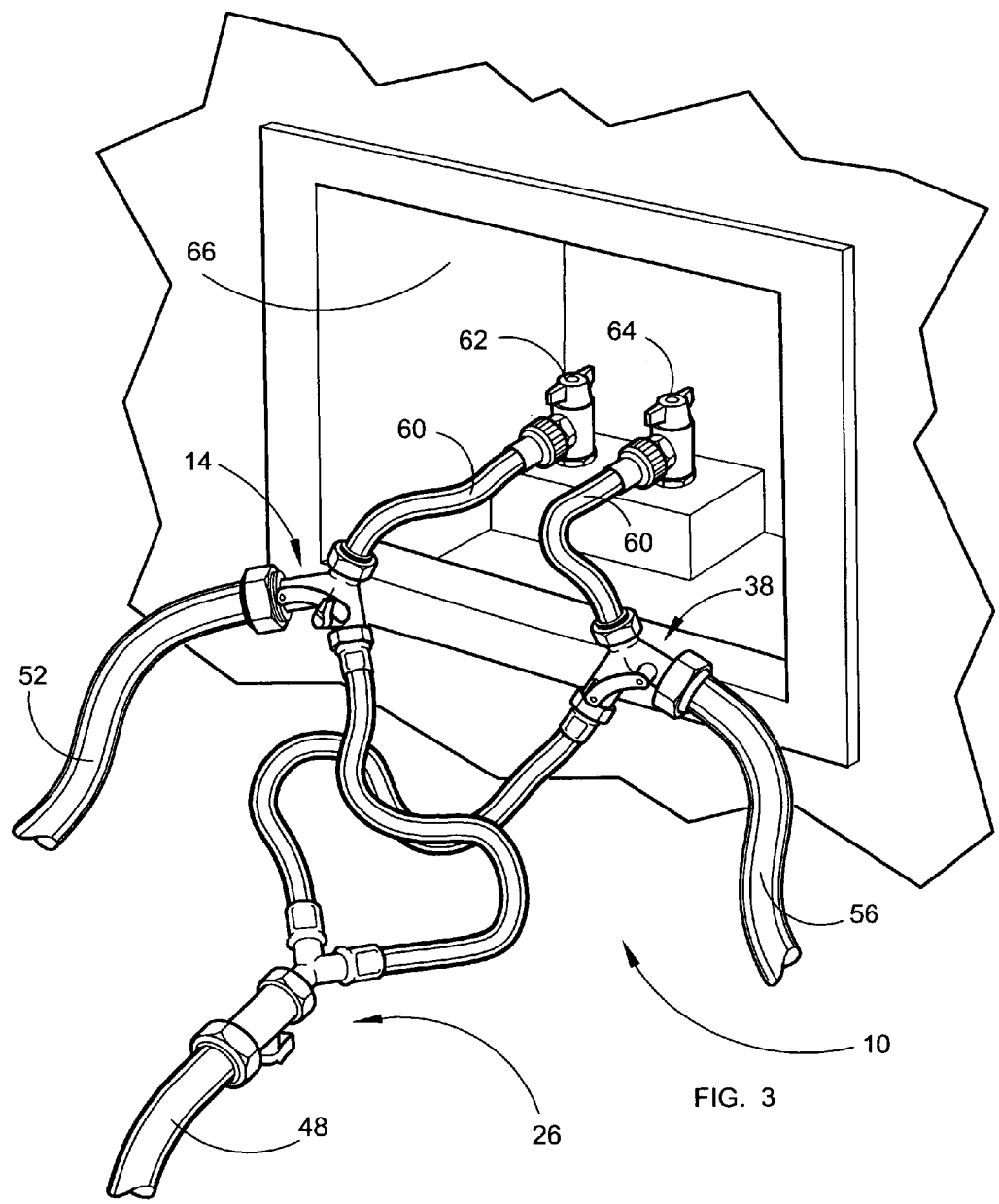
FIG. 3 depicts a perspective view of the utility hot and cold water mixing system with the hot and cold water hoses from a washing machine along with a garden hose connected to the device that has the adapters attached to fit into the valve boxes used on newer homes.

FIG. 3 depicts a perspective view of the utility hot and cold water mixing system 10 with the hot and cold water hoses 52 and 56 from a washing machine along with a garden hose 48 connected to the device. The utility hot and cold water mixing system 10 has the adapters 60 attached to fit the hot water valve 62 and the cold water valve 64 in the valve box 66 that is often used on newer homes. The adapters 60 have been shown incorporating a flexible hose but it must be understood that a rigid connection could be used to achieve the same results and still fall within the scope of this patent.

The present invention is directed to a utility hot and cold water mixing system 10 shown in the drawings and described in detail herein disclose arrangements of elements of particular construction and configuration for illustrating preferred embodiments of structure and method of operation of the present invention. It is to be understood, however, that elements of different construction and configuration and other arrangements thereof, other than those illustrated and described may be employed for providing a utility hot and cold water mixing system 10 in accordance with the spirit of this invention, and such changes, alternations and modifications as would occur to those skilled in the art are considered to be within the scope of this invention as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. A utility hot and cold water mixing system comprising:
   (a) a visibly accessible hot water Y-coupler for connection to a hot water source, including means for adjustably controlling the water flow through said hot water Y-coupler;
   (b) a visibly accessible central Y-coupler in fluid communication with said hot water Y-coupler, including means for adjustably controlling the water flow through said central Y-coupler;
   (c) a visibly accessible cold water Y-coupler for connection to a cold water source, in fluid communication with said central Y-coupler; and
   (d) a visibly accessible flexible hose system which interconnects said hot water Y-coupler, said central Y-coupler and said cold water coupler, wherein said hose system stores in a twisted coiled position when not in use and retains its tensile memory and holds said central Y-coupler in an original ready to use twisted coiled position, such that following use said central Y-coupler springs back into its stored twisted coiled position for easy access by a user prior to its next use;
   whereby said means for adjustably controlling the water flow through said hot water Y-coupler is adjusted or preset to maintain the temperature of the water flowing through the system, and said means for adjustably controlling the water flow through said central Y-coupler is adjusted to control the flow rate of the water flowing out of the system.

2. The utility hot and cold water mixing system according to claim 1, wherein said means for adjustably controlling the water flow through said hot water Y-coupler include a water flow control ball valve.

3. The utility hot and cold water mixing system according to claim 2, wherein said flow control ball valve includes an information plate mounted on said hot water Y-coupler to indicate the direction to turn said valve to achieve the desired water temperature.

4. The utility hot and cold water mixing system according to claim 1, wherein said central Y-coupler works as an on and off valve for the system.

5. The utility hot and cold water mixing system according to claim 1, wherein said means for adjustably controlling the water flow through said central Y-coupler includes a water flow control ball valve.

6. The utility hot and cold water mixing system according to claim 1, wherein said hot water Y-coupler for connection to a hot water source and said central Y-coupler in fluid communication with said hot water Y-coupler, include connection to a hose of variable length enabling fluid communication there between.

7. The utility hot and cold water mixing system according to claim 1, wherein said cold water Y-coupler for connection to a cold water source and said central Y-coupler in fluid communication with said cold water Y-coupler, include connection to a hose of variable length enabling fluid communication there between.

8. The utility hot and cold water mixing system according to claim 1, wherein said hot water Y-coupler and said cold water Y-coupler connect to the hot water source and the cold water source, respectively, using conventional hose bib couplings.

9. The utility hot and cold water mixing system according to claim 6, wherein said hose of variable length is connected to said hot water Y-coupler and said central Y-coupler using conventional crimped hose fittings.

10. The utility hot and cold water mixing system according to claim 7, wherein said hose of variable length is connected to said cold water Y-coupler and said central Y-coupler using conventional crimped hose fittings.

11. A method for making a utility hot and cold water mixing system comprising the steps of:
    (a) providing a hot water source;
    (b) providing a cold water source;
    (c) providing a visibly accessible hot water Y-coupler for connection to a hot water source, including means for adjustably controlling the water flow through said hot water Y-coupler;
    (d) providing a visibly accessible central Y-coupler in fluid communication with said hot water Y-coupler, including means for adjustably controlling the water flow through said central Y-coupler;
    (e) providing a visibly accessible cold water Y-coupler for connection to a cold water source, in fluid communication with said central Y-coupler; and
    (f) interconnecting said hot water Y-coupler, said central Y-coupler and said cold water coupler, with a hose system, wherein said hose system retains its tensile memory and holds said central Y-coupler in an stored twisted coiled position, such that following use said central Y-coupler springs back into its stored twisted coiled position for easy access by a user prior to its next use;
    whereby said means for adjustably controlling the water flow through said hot water Y-coupler is adjusted or preset to maintain the temperature of the water flowing through the system, and said means for adjustably controlling the water flow through said central Y-coupler is adjusted to control the flow rate of the water flowing out of the system.

12. The method for making a utility hot and cold water mixing system according to claim 11, wherein said step of providing a hot water Y-coupler for connection to a hot water source, including means for adjustably controlling the water flow through said hot water Y-coupler includes the step of providing a water flow control ball valve.

13. The method for making a utility hot and cold water mixing system according to claim 12, further including the step of providing said flow control ball valve including an information plate mounted on said hot water Y-coupler to indicate the direction to turn said valve to achieve the desired water temperature.

14. The method for making a utility hot and cold water mixing system according to claim 11, wherein said step of providing a central Y-coupler in fluid communication with said hot water Y-coupler, including means for adjustably controlling the water flow through said central Y-coupler further includes using said central Y-coupler as an on and off valve for the system.

15. The method for making a utility hot and cold water mixing system according to claim 11, wherein said step of providing a central Y-coupler in fluid communication with said hot water Y-coupler, including means for adjustably controlling the water flow through said central Y-coupler, wherein said means for adjustably controlling the water flow through said central Y-coupler includes a water flow control ball valve.

16. The method for making a utility hot and cold water mixing system according to claim 11, wherein said step of providing a central Y-coupler in fluid communication with said hot water Y-coupler, further includes the step of connecting said central Y-coupler to said hot water Y-coupler, using a hose of variable length enabling fluid communication there between.

17. The method for making a utility hot and cold water mixing system according to claim 11, wherein said step of providing a central Y-coupler in fluid communication with said cold water Y-coupler, further includes the step of connecting said central Y-coupler to said cold water Y-coupler, using a hose of variable length enabling fluid communication there between.

18. The method for making a utility hot and cold water mixing system according to claim 11, wherein said hot water Y-coupler and said cold water Y-coupler connect to the hot water source and the cold water source, respectively, using conventional hose bib couplings.

19. The method for making a utility hot and cold water mixing system according to claim 16, wherein said hose of variable length is connected to said hot water Y-coupler and said central Y-coupler using conventional crimped hose fittings.

20. The method for making a utility hot and cold water mixing system according to claim 17, wherein said hose of variable length is connected to said cold water Y-coupler and said central Y-coupler using conventional crimped hose fittings.

* * * * *